US012612027B2

(12) United States Patent
Oldroyd et al.

(10) Patent No.: US 12,612,027 B2
(45) Date of Patent: Apr. 28, 2026

(54) ROTOR ASSEMBLIES FOR VEHICLE PROPULSION

(71) Applicant: Textron Innovations Inc., Providence, RI (US)

(72) Inventors: Paul K. Oldroyd, Azle, TX (US); John Richard McCullough, Weatherford, TX (US)

(73) Assignee: Textron Innovations Inc., Providence, RI (US)

( * ) Notice: Subject to any disclaimer, the term of this patent is extended or adjusted under 35 U.S.C. 154(b) by 625 days.

(21) Appl. No.: 18/109,144

(22) Filed: Feb. 13, 2023

(65) Prior Publication Data

US 2023/0192255 A1 Jun. 22, 2023

Related U.S. Application Data

(63) Continuation-in-part of application No. 17/677,721, filed on Feb. 22, 2022, now Pat. No. 11,767,006.

(60) Provisional application No. 63/431,013, filed on Dec. 7, 2022, provisional application No. 63/278,472, filed on Nov. 11, 2021.

(51) Int. Cl.
B60V 1/14 (2006.01)
B64C 11/06 (2006.01)

(52) U.S. Cl.
CPC .............. B60V 1/14 (2013.01); B64C 11/06 (2013.01)

(58) Field of Classification Search
CPC ....... B60V 1/14; B64C 11/06; F04D 29/0405; F03D 7/0024
See application file for complete search history.

(56) References Cited

U.S. PATENT DOCUMENTS 2,997,111 A * 8/1961 Biermann .............. F16C 19/163
                                                    416/205
4,156,475 A * 5/1979 Chaplin ................... B60V 1/14
                                                    180/117

(Continued)

FOREIGN PATENT DOCUMENTS

GB        2564105 A * 1/2019 ............... B60V 1/14
RU        2783156 C1 * 11/2022

OTHER PUBLICATIONS

Liang, Machine Translation of RU278156, 2022 (Year: 2022).*

*Primary Examiner* — Michael K. Reitz
(74) *Attorney, Agent, or Firm* — Lawrence Youst PLLC

(57) ABSTRACT

A rotor assembly for generating vehicle thrust. The rotor assembly includes a rotor hub with a plurality of rotor blade assemblies coupled thereto. Each rotor blade assembly includes a metallic bearing race, a composite rotor blade and a split collet assembly. The split collet assembly includes two circumferentially distributed collet members each having an inner inboard conical seat configured to mate with a radially outwardly extending conical feature of the bearing race and an inner outboard conical seat configured to mate with a radially outwardly extending conical feature of the rotor blade. The split collet assembly also includes an outer sleeve having an inner conical surface that mates with outer conical surfaces of the collet members to maintain the collet members in a circumferential orientation around the bearing race and the rotor blade such that the split collet assembly provides a centrifugal force load path therebetween.

19 Claims, 11 Drawing Sheets

(56) References Cited

U.S. PATENT DOCUMENTS

| | | | |
|---|---|---|---|
| 4,524,499 A * | 6/1985 | Grimes | B64C 27/46 |
| | | | 416/241 A |
| 7,654,211 B2 | 2/2010 | Maloney et al. | |
| 2009/0220344 A1 | 9/2009 | Pfeiffer et al. | |
| 2016/0272299 A1 | 9/2016 | Nagle et al. | |
| 2016/0376919 A1* | 12/2016 | Miller | F01D 5/3023 |
| | | | 416/220 R |
| 2017/0101877 A1 | 4/2017 | Niergarth et al. | |
| 2021/0031744 A1 | 2/2021 | Allen et al. | |
| 2021/0062661 A1* | 3/2021 | Loos | F03B 3/128 |

* cited by examiner

ROTOR ASSEMBLIES FOR VEHICLE PROPULSION

CROSS-REFERENCE TO RELATED APPLICATIONS

The present application claims the benefit of provisional application No. 63/431,013, filed Dec. 7, 2022 and is a continuation-in-part of co-pending application Ser. No. 17/677,721 filed Feb. 22, 2022, which claims the benefit of provisional application No. 63/278,472, filed Nov. 11, 2021, the entire contents of each is hereby incorporated by reference.

TECHNICAL FIELD OF THE DISCLOSURE

The present disclosure relates, in general, to rotor assemblies operable to generate thrust for the propulsion of a vehicle and, in particular, to rotor assemblies utilizing split collet assemblies to provide centrifugal force load paths between composite rotor blades and metallic bearing races.

BACKGROUND

Many vehicles use rotor assemblies to generate thrust that propels the vehicle on or through the water or in the air. A typical rotor assembly has a rotating hub with a plurality of rotor blades radiating therefrom that exert a linear force upon a working fluid, such as water or air, when the rotor assembly is rotated. Specifically, due to the shape of the rotor blades, the rotational motion of the rotor assembly in the fluid causes a pressure difference between the forward and aft surfaces of the rotor blades according to Bernoulli's principle. Many marine vehicles use screw propellers with helical blades that rotate on a horizontal shaft. Aircraft utilize a variety of rotor assemblies for propulsion including twisted airfoil shaped propellers on fixed wing aircraft, rotary wings on helicopters and proprotors on tiltrotor aircraft.

Amphibious air-cushion vehicles that can travel over water and land supported by a downwardly ejected cushion of air are another type of vehicle that uses rotor assemblies to generate thrust. Certain air-cushion vehicles utilize dual ducted rotor assemblies that have variable pitch rotor blades to control the speed and direction of the vehicle. The versatile amphibious capability of these vehicles not only enables them to traverse deep water, shallows and reefs but also enables them to drive onto land such as beaches. For example, large air-cushion vehicles such as the Landing Craft Air Cushion (LCAC) and the Ship-to-Shore Connector (SSC) can access more than seventy percent of the world's coastline for rapid deployment of large payloads such as vehicles, heavy equipment, supplies and troops. In addition, these large air-cushion vehicles are valuable in supporting humanitarian relief efforts throughout the world including delivering life-saving equipment, food, water and medical supplies.

SUMMARY

In a first aspect, the present disclosure is directed to a rotor assembly for generating vehicle thrust. The rotor assembly includes a rotor hub and a plurality of rotor blade assemblies coupled to the rotor hub. Each of the rotor blade assemblies includes a metallic bearing race, a composite rotor blade and a split collet assembly. The bearing race has an outboard end with a radially outwardly extending conical feature. The rotor blade has a root end with a radially outwardly extending conical feature. The split collet assembly includes at least two circumferentially distributed collet members and an outer sleeve. Each of the collet members has an inner inboard conical seat configured to mate with the conical feature of the bearing race, an inner outboard conical seat configured to mate with the conical feature of the rotor blade and an outer conical surface. The outer sleeve has an inner conical surface that mates with the outer conical surfaces of the collet members such that the outer sleeve maintains the collet members in a circumferential orientation around the bearing race and the rotor blade such that the split collet assembly provides a centrifugal force load path between the rotor blade and the bearing race.

In some embodiments, the rotor assembly may include a duct and a plurality of stators coupling the duct to the rotor hub such that the rotor blade assemblies are disposed within the duct. In certain embodiments, each of the bearing races may include a ball bearing race and a roller bearing race. In some embodiments, each of the bearing races may be a steel bearing race. In certain embodiments, each of the rotor blades may be a carbon fiber rotor blade. In some embodiments, each of the collet members may be a titanium collet member or a steel collet member. In certain embodiments, each of the outer sleeves may be a steel outer sleeve. In some embodiments, each rotor blade assembly may include a conical wear ring disposed between the inner inboard conical seats of the collet members and the conical feature of the bearing race. In certain embodiments, each of the conical wear rings may be a segmented conical wear ring. In some embodiments, each of the conical wear rings may be a beryllium copper conical wear ring.

In some embodiments, each rotor blade assembly may include at least one anti-rotation element coupled between the bearing race and the rotor blade and configured to prevent relative rotation therebetween. In certain embodiments, each of the bearing races may include first and second slots and each of the rotor blades may include first and second slots. In such embodiments, each rotor blade assembly may include first and second anti-rotation elements with the first anti-rotation element coupled between circumferentially aligned first slots of the bearing race and the rotor blade and the second anti-rotation element coupled between circumferentially aligned second slots of the bearing race and the rotor blade such that the first and second anti-rotation elements are configured to prevent relative rotation between the bearing race and the rotor blade. Also in such embodiments, for each rotor blade assembly, the first and second anti-rotation elements may be circumferentially positioned between two of the collet members.

In certain embodiments, each rotor blade assembly may include a spacer ring positioned between the bearing race and the rotor blade. In some embodiments, each of the spacer rings may be a steel spacer ring. In certain embodiments, for each rotor blade assembly, the outer conical surfaces of the collet members and the inner conical surface of the outer sleeve may be radially inwardly tapered in the outboard direction. In other embodiments, for each rotor blade assembly, the outer conical surfaces of the collet members and the inner conical surface of the outer sleeve may be radially outwardly tapered in the outboard direction. In some embodiments, each rotor blade assembly may include a plurality of fasteners coupling the outer sleeve to the collet members.

In a second aspect, the present disclosure is directed to a vehicle operable for forward motion responsive to thrust. The vehicle includes a rotor assembly including a rotor hub and a plurality of rotor blade assemblies coupled to the rotor hub. Each of the rotor blade assemblies includes a metallic bearing race, a composite rotor blade and a split collet assembly. The bearing race has an outboard end with a radially outwardly extending conical feature. The rotor blade has a root end with a radially outwardly extending conical feature. The split collet assembly includes at least two circumferentially distributed collet members and an outer sleeve. Each of the collet members has an inner inboard conical seat configured to mate with the conical feature of the bearing race, an inner outboard conical seat configured to mate with the conical feature of the rotor blade and an outer conical surface. The outer sleeve has an inner conical surface that mates with the outer conical surfaces of the collet members such that the outer sleeve maintains the collet members in a circumferential orientation around the bearing race and the rotor blade such that the split collet assembly provides a centrifugal force load path between the rotor blade and the bearing race. In some embodiments, the vehicle may be an amphibious air-cushion vehicle.

BRIEF DESCRIPTION OF THE DRAWINGS

For a more complete understanding of the features and advantages of the present disclosure, reference is now made to the detailed description along with the accompanying figures in which corresponding numerals in the different figures refer to corresponding parts and in which.

DETAILED DESCRIPTION

While the making and using of various embodiments of the present disclosure are discussed in detail below, it should be appreciated that the present disclosure provides many applicable inventive concepts, which can be embodied in a wide variety of specific contexts. The specific embodiments discussed herein are merely illustrative and do not delimit the scope of the present disclosure. In the interest of clarity, not all features of an actual implementation may be described in the present disclosure. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present disclosure, the devices, members, apparatuses, and the like described herein may be positioned in any desired orientation. Thus, the use of terms such as "above," "below," "upper," "lower" or other like terms to describe a spatial relationship between various components or to describe the spatial orientation of aspects of such components should be understood to describe a relative relationship between the components or a spatial orientation of aspects of such components, respectively, as the device described herein may be oriented in any desired direction. As used herein, the term "coupled" may include direct or indirect coupling by any means, including moving and/or non-moving mechanical connections.

Figure 1A:
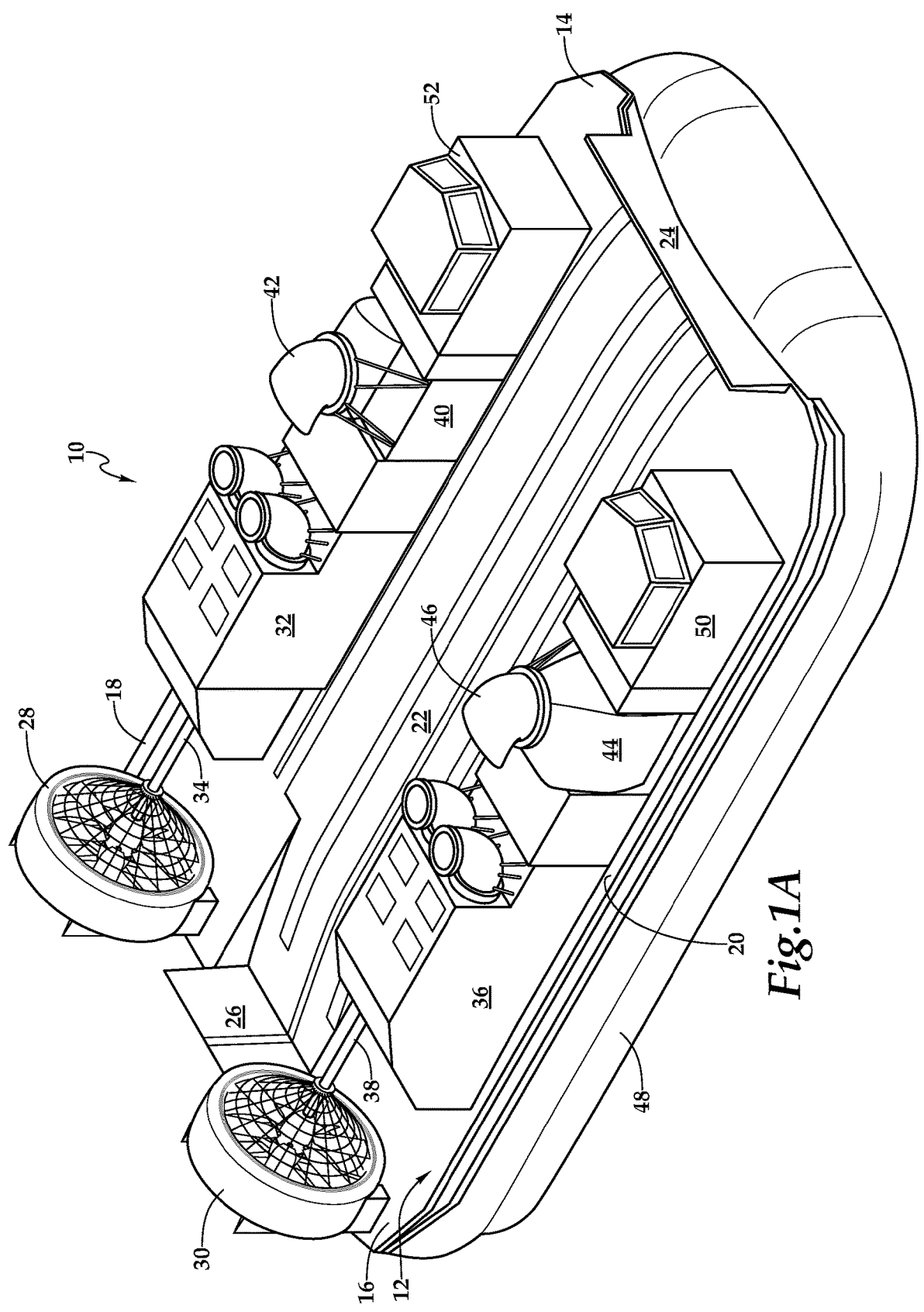
FIGS. 1A-1C are schematic illustrations of an amphibious air-cushion vehicle having dual ducted rotor assemblies for generating thrust in accordance with embodiments of the present disclosure.
Figures 1B, 1C:
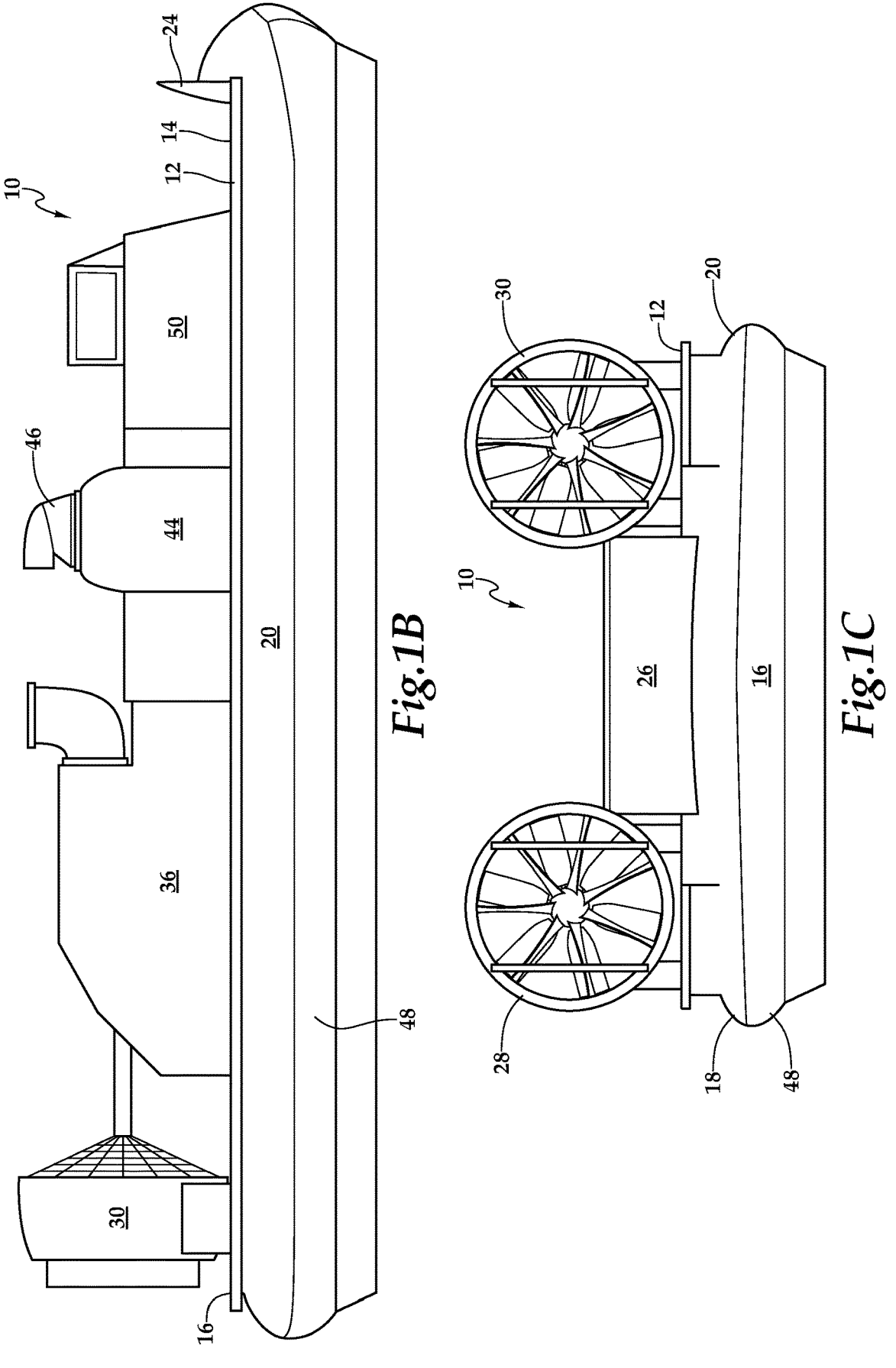

Referring to FIGS. 1A-1C in the drawings, an amphibious air-cushion vehicle is schematically illustrated and generally designated 10. Vehicle 10 includes a hull 12 having a bow portion 14, a stern portion 16, a port side 18 and a starboard side 20. In the illustrated embodiment, vehicle 10 includes an open deck space 22, a bow ramp 24 and a stern ramp 26 enabling roll-on/roll-off loading and unloading of cargo and equipment including, for example, high-speed offloading during a cargo drop scenario into a hostile landing area. Vehicle 10 is equipped with dual ducted air propulsors depicted as port rotor assembly 28 and starboard rotor assembly 30. Rotor assembly 28 is driven by a gas turbine engine 32 via a drive shaft 34. Rotor assembly 30 is driven by a gas turbine engine 36 via a drive shaft 38. Gas turbine engine 32 also drives a lift fan 40 and a bow thruster 42. Likewise, gas turbine engine 36 also drives a lift fan 44 and a bow thruster 46. Lift fans 40, 44 are used to produce large volumes air that form an air cushion below hull 12 and within a skirt 48 that lifts hull 12 such that vehicle 10 floats above a running surface such as water or land. Bow thrusters 42, 46 are used to enhance the maneuverability of vehicle 10 particularly at lower speeds. Vehicle 10 includes a pilot and copilot module 50 that supports the command and control station of vehicle 10. Vehicle 10 also includes a personnel and equipment module 52.

Figure 2A:
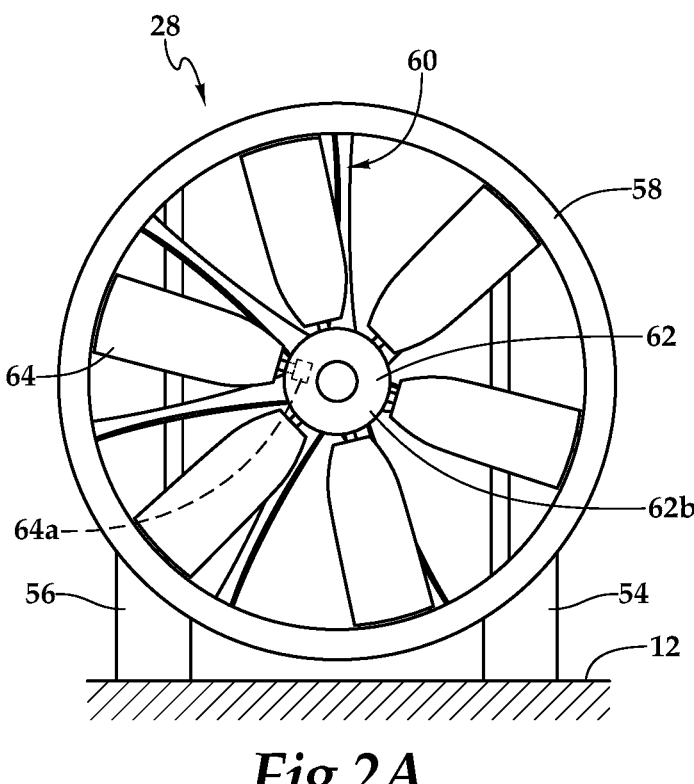
FIGS. 2A-2B are schematic illustrations of a ducted rotor assembly for generating vehicle thrust in accordance with embodiments of the present disclosure.
Figure 2B:
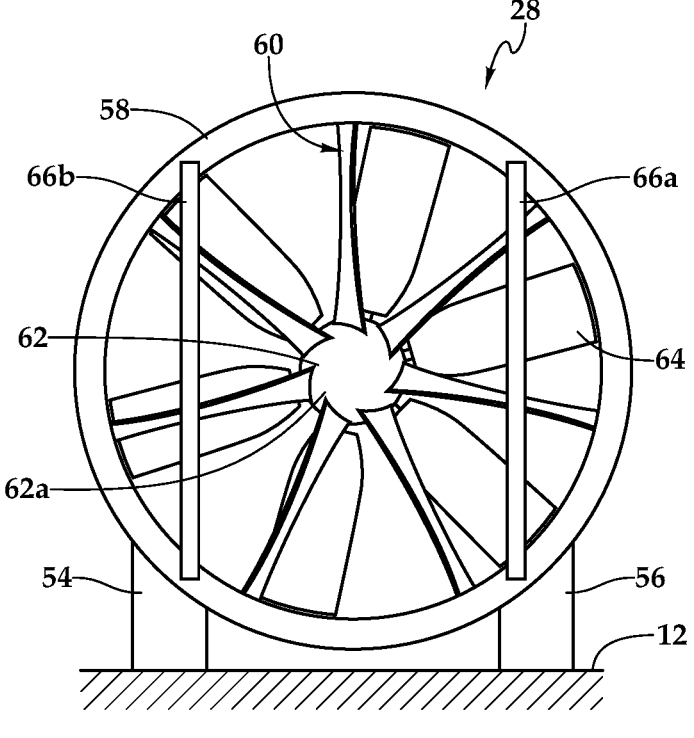

Referring additionally to FIGS. 2A-2B in the drawings, rotor assembly 28 is disclosed in further detail. Rotor assembly 30 is substantially similar to rotor assembly 28 therefore, for sake of efficiency, certain features will be disclosed only with regard to rotor assembly 28. One having ordinary skill in the art, however, will fully appreciate an understanding of rotor assembly 30 based upon the disclosure herein of rotor assembly 28. FIG. 2A depicts rotor assembly 28 from the inlet side or a forward perspective and FIG. 2B depicts rotor assembly 28 from the outlet side or an aft perspective. A forward screen, as best seen in FIG. 1A, has been removed from rotor assembly 28 for clarity. Rotor assembly 28 is coupled to hull 12 of vehicle 10 by a suitable support structure depicted as a pair of pedestals 54, 56. Rotor assembly 28 includes a generally cylindrical outer duct 58 that is preferrable formed from a strong and lightweight material such as a carbon fiber composite. In the illustrated embodiment, rotor assembly 28 includes a stator system 60 having seven twisted stators that are formed from a strong and lightweight material such as a carbon fiber composite. In other embodiments, stator system 60 may include other numbers of stators both greater than or less than seven, the stators could have other designs such as straight stators and/or the stators could be formed from other materials such as metals including aluminum.

Stator system 60 supports a rotor hub 62 within duct 58 of rotor assembly 28. Rotor hub 62 includes a fixed portion 62a that is coupled to stator system 60 and a rotating portion 62b that is coupled to a plurality of rotor blade assemblies 64. Rotor hub 62 houses structural and control components that support the centrifugal force generated by rotor blade assemblies 64 and enable collective pitch operations of rotor blade assemblies 64 to provide variable thrust to vehicle 10. Specifically, each rotor blade assembly 64 is coupled to a bearing assembly 64a disposed within rotor hub 62, such as a bearing assembly that includes a ball bearing set and a roller bearing set, which react centrifugal and bending loads from the rotor blade assembly 64 during rotary operations and collective pitch change operations. In the illustrated embodiment, rotor assembly 28 includes six rotor blade assemblies 64 that are formed from a strong and lightweight material such as a carbon fiber composite. In other embodiments, rotor assembly 28 may include other numbers of rotor blade assemblies both greater than or less than six. In the illustrated embodiment, rotor assembly 28 includes a pair of vertically extending rudders 66a, 66b that are coupled to the aft side of duct 58. Rudders 66a, 66b are rotatable relative to duct 58 to control the direction of thrust from rotor assembly 28 and thus the direction of travel of vehicle 10.

Figure 3B:
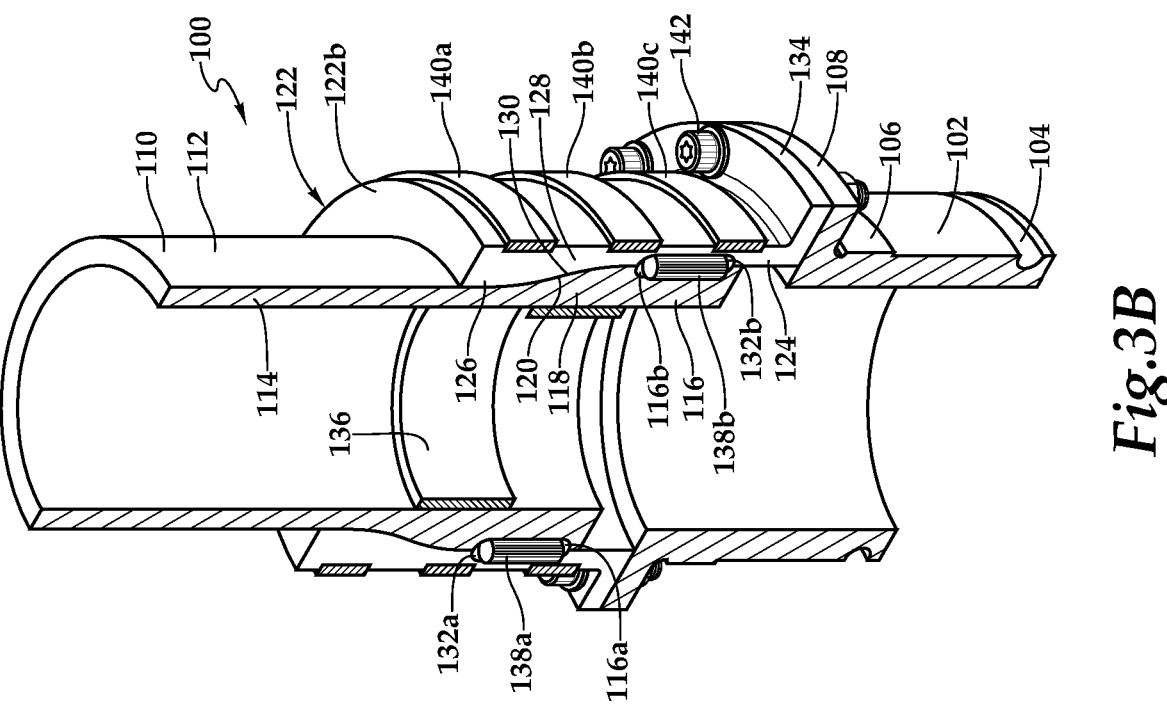
FIGS. 3A-3B are front and cross sectional views of a metallic coupling assembly coupling a composite rotor blade to a metallic bearing race to provide a centrifugal force load path therebetween in accordance with embodiments of the present disclosure.
Figure 3A:
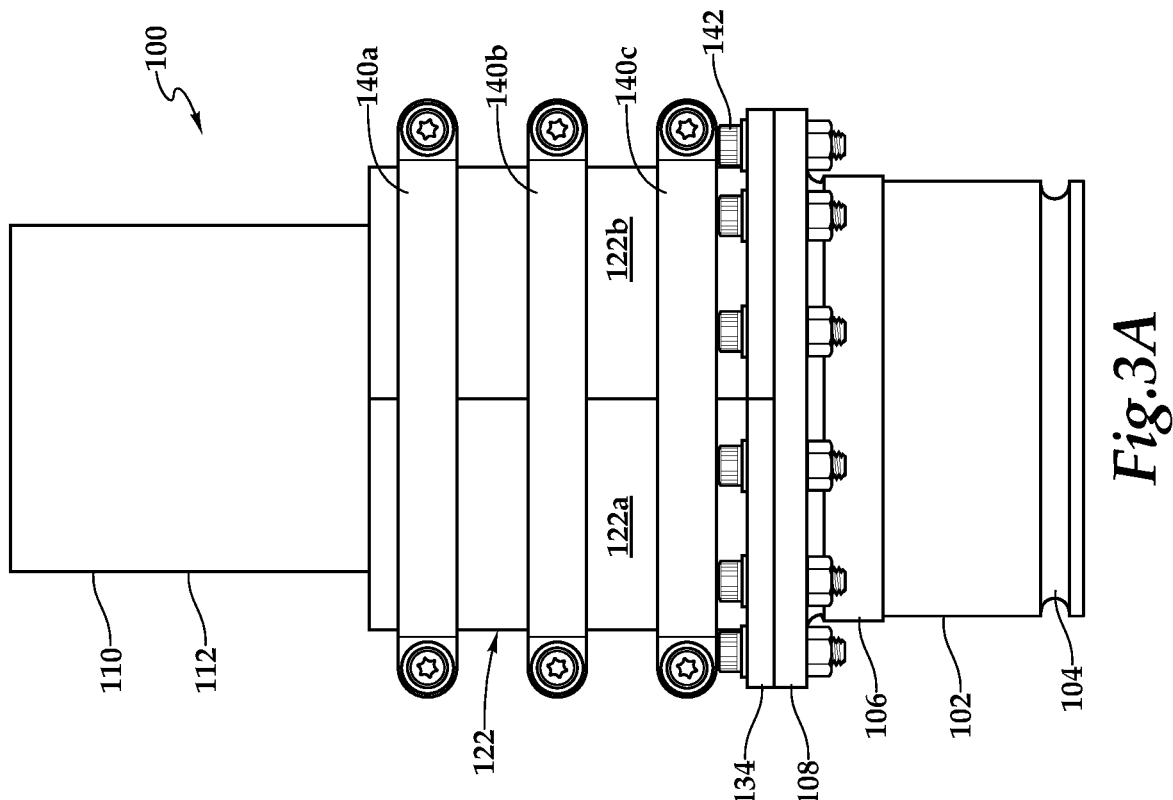

Referring next to FIGS. 3A-3B in the drawings, component parts of a rotor blade assembly 100 that is representative of rotor blade assemblies 64 will now be discussed. Rotor blade assembly 100 includes a metallic bearing race 102, depicted as including a ball bearing race 104 and a roller bearing race 106, that is received within and supported by one of the bearing assemblies 64a of rotor hub 62. Bearing race 102 includes a flange end 108 having a plurality of bolt openings. In the illustrated embodiment, bearing race 102 is a steel component machined to the desired specifications and tolerances. Rotor blade assembly 100 includes a composite rotor blade 110 with only the root section 112 being visible in the drawings. Rotor blade 110 is preferably a monolithic structure formed using a broad goods and/or layered tape construction process having a manual or automated layup of a plurality of composite broad goods material layers such as carbon fabric, carbon tape and combinations thereof. After curing, the material layers form a high strength, lightweight solid composite member.

Root section 112 of rotor blade 110 has a generally cylindrical shape with a constant inner diameter along its length but a changing outer diameter along its length. More specifically, root section 112 has an outboard section 114 having a first wall thickness and an inboard section 116 having a second wall thickness that is greater than the first wall thickness with a tapered section 118 therebetween having a radially outwardly tapered outer surface 120 extending from outboard section 114 to inboard section 116. In the illustrated embodiment, the ratio of the wall thicknesses of inboard section 116 to outboard section 114 is about 2 to 1. In other embodiments, the wall thicknesses of inboard section 116 and outboard section 114 may have other ratios both greater than or less than 2 to 1 including 4 to 1, 3 to 1, 5 to 2, 3 to 2 or other desired wall thickness ratio. Radially outwardly tapered outer surface 120 may progress in a linear or nonlinear manner and may have different contours or slopes in different portions thereof. As such, it should be understood by those skilled in the art that the profile of radially outwardly tapered outer surface 120 will be determined based upon structural and dynamic analysis for the specific implementation including, for example, the centrifugal load requirement of tapered section 118. In the illustrated embodiment, inboard section 116 of root section 112 includes a pair of oppositely disposed pockets 116a, 116b.

In the illustrated embodiment, rotor blade assembly 100 includes a metallic coupling assembly 122 depicted as two semi-cylindrical coupling members 122a, 122b that together form a substantially cylindrical coupling assembly. In other embodiments, a multi-piece coupling assembly may include more than two circumferentially distributed coupling members that together form a substantially cylindrical coupling assembly. Coupling assembly 122 has a generally constant outer diameter along its length but a changing inner diameter along its length. More specifically, an inboard section 124 of coupling assembly 122 has a first wall thickness and an outboard section 126 of coupling assembly 122 has a second wall thickness that is greater than the first wall thickness with a tapered section 128 therebetween having a radially inwardly tapered inner surface 130 extending from inboard section 124 to outboard section 126. In the illustrated embodiment, the ratio of the wall thicknesses of outboard section 126 and inboard section 124 is about 2 to 1. In other embodiments, the wall thicknesses of outboard section 126 and inboard section 124 may have other ratios both greater than or less than 2 to 1 including 4 to 1, 3 to 1, 5 to 2, 3 to 2 or other desired wall thickness ratio. Radially inwardly tapered inner surface 130 has a matching profile with radially outwardly tapered outer surface 120 such that radially inwardly tapered inner surface 130 provides a centrifugal force seat for radially outwardly tapered outer surface 120 and thus for rotor blade 110. A compliant layer, such as an adhesive layer or polymer layer, may provide an interface between radially inwardly tapered inner surface 130 and radially outwardly tapered outer surface 120 that may allow for certain strain resolution between rotor blade 110 and coupling assembly 122. In the illustrated embodiment, coupling assembly 122 includes a pair of oppositely disposed pockets 132a, 132b. In addition, coupling assembly 122 includes a flange end 134 having a plurality of bolt openings. In the illustrated embodiment, coupling assembly 122 is a titanium component machined to the desired specifications and tolerances. In other embodiments, coupling assembly 122 could be formed from other metals such as aluminum.

An assembly process for rotor blade assembly 100 will now be described. As best seen in FIG. 3B, a metallic support ring 136 is disposed within root section 112 of rotor blade 110 generally radially aligned with tapered section 118. Metallic support ring 136 provides added hoop strength to root section 112 at tapered section 118 to prevent any deformation of root section 112 responsive to centrifugal and/or bending loads. Coupling member 122b is then positioned relative to root section 112 such that radially inwardly tapered inner surface 130 mates with radially outwardly tapered outer surface 120 and such that pockets 116*a*, 116*b* of inboard section 116 are aligned with pockets 132*a*, 132*b* of coupling member 122*b*. Anti-rotation keys 138*a*, 138*b* are placed within the cavities created respectively by pockets 116*a*, 132*a* and pockets 116*b*, 132*b*. Coupling member 122*a* may now be positioned relative to root section 112 such that radially inwardly tapered inner surface 130 mates with radially outwardly tapered outer surface 120 and such that pockets 116*a*, 116*b* of inboard section 116 are aligned with pockets 132*a*, 132*b* of coupling member 122*a*. In this manner, anti-rotation keys 138*a*, 138*b* are captured between rotor blade 110 and coupling assembly 122 and serve as an anti-rotation element to prevent relative rotation therebetween when rotor blade assembly 100 is fully assembled. Even though two anti-rotation keys have been depicted and described, it should be understood by those having ordinary skill in the art that any number of anti-rotation keys could be circumferentially distributed between rotor blade 110 and coupling assembly 122.

The two parts of coupling assembly 122 may now be circumferentially secured together about root section 112 of rotor blade 110. In the illustrated embodiment, this is achieved using three circumferential bands 140*a*, 140*b*, 140*c* that are received within radially inwardly projecting channels in coupling members 122*a*, 122*b*. Circumferential bands 140*a*, 140*b*, 140*c* each include two semi-circumferential members that are coupled together with bolts, as best seen in FIG. 3A. In this manner, coupling members 122*a*, 122*b* are secured together and secured to root section 112 of rotor blade 110. Even though circumferential bands 140*a*, 140*b*, 140*c* have been depicted and described as being secured about coupling assembly 122 with tension bolts, it should be understood by those having ordinary skill in the art that circumferential bands of the present disclosure could alternatively be secured about coupling assembly 122 with one or more shear bolts. Flange end 134 of coupling assembly 122 is now positioned relative to flange end 108 of bearing race 102 such that the respective bolt openings are aligned. A plurality of bolts 142 may now be used to secured coupling assembly 122 to bearing race 102 such that bolts 142 provide a centrifugal force load path therebetween and prevent relative rotation therebetween. In this manner, a centrifugal force load path is provided between composite rotor blade 110 and metallic bearing race 102 by metallic coupling assembly 122.

Figure 4B:
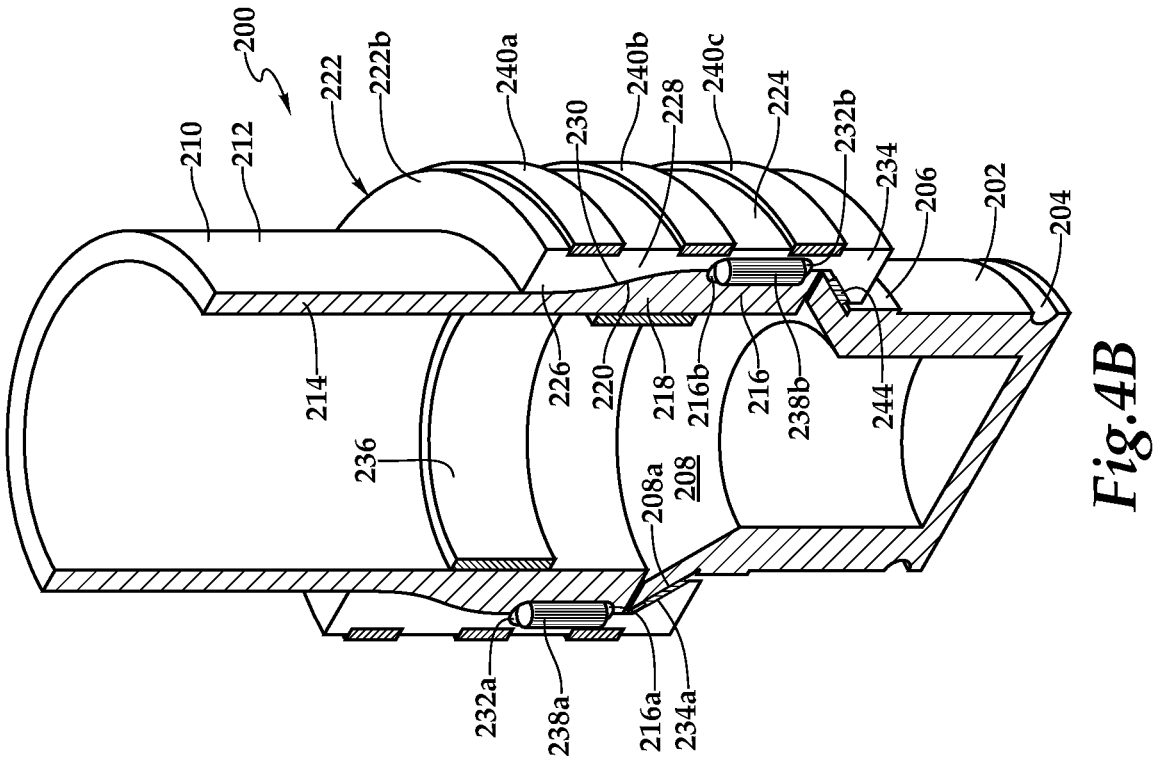
FIGS. 4A-4B are front and cross sectional views of a metallic coupling assembly coupling a composite rotor blade to a metallic bearing race to provide a centrifugal force load path therebetween in accordance with embodiments of the present disclosure.
Figure 4A:
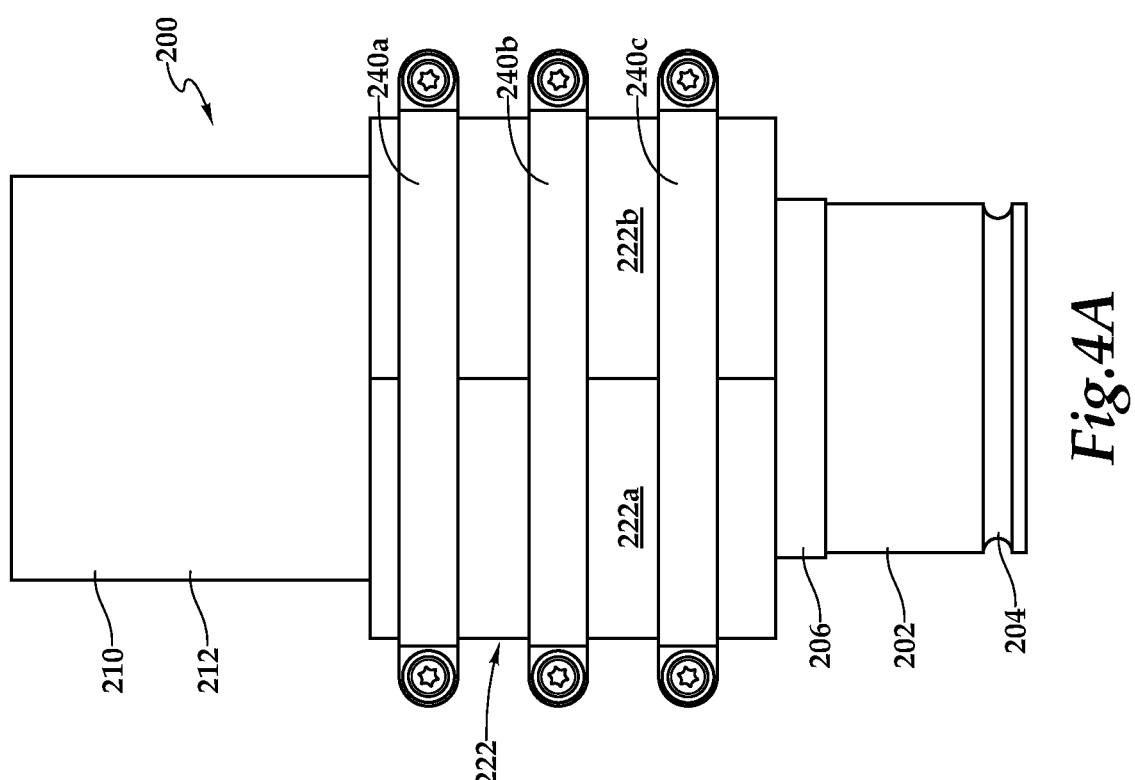

Referring next to FIGS. 4A-4B in the drawings, component parts of a rotor blade assembly 200 that is representative of rotor blade assemblies 64 will now be discussed. Rotor blade assembly 200 includes a metallic bearing race 202, depicted as including a ball bearing race 204 and a roller bearing race 206, that is received within and supported by one of the bearing assemblies 64*a* of rotor hub 62. Bearing race 202 includes a radially outwardly extending conical end 208 having an outer conical surface 208*a*. Rotor blade assembly 200 includes a composite rotor blade 210 with only the root section 212 being visible in the drawings. Root section 212 of rotor blade 210 has a generally cylindrical shape with a constant inner diameter along its length but a changing outer diameter along its length. More specifically, root section 212 has an outboard section 214 having a first wall thickness and an inboard section 216 having a second wall thickness that is greater than the first wall thickness with a tapered section 218 therebetween having a radially outwardly tapered outer surface 220 extending from outboard section 214 to inboard section 216.

Radially outwardly tapered outer surface 220 may progress in a linear or nonlinear manner and may have different contours or slopes in different portions thereof. In the illustrated embodiment, inboard section 216 of root section 212 includes a pair of oppositely disposed pockets 216*a*, 216*b*.

Rotor blade assembly 200 includes a metallic coupling assembly 222 depicted as two semi-cylindrical coupling members 222*a*, 222*b* that together form a substantially cylindrical coupling assembly with a generally constant outer diameter along its length but a changing inner diameter along its length. More specifically, an inboard section 224 of coupling assembly 222 has a first wall thickness and an outboard section 226 of coupling assembly 222 has a second wall thickness that is greater than the first wall thickness with a tapered section 228 therebetween having a radially inwardly tapered inner surface 230 extending from inboard section 224 to outboard section 226. Radially inwardly tapered inner surface 230 has a matching profile with radially outwardly tapered outer surface 220 such that radially inwardly tapered inner surface 230 provides a centrifugal force seat for radially outwardly tapered outer surface 220 and thus for rotor blade 210. A compliant layer, such as an adhesive layer or polymer layer, may provide an interface between radially inwardly tapered inner surface 230 and radially outwardly tapered outer surface 220 that may allow for certain strain resolution between rotor blade 210 and coupling assembly 222. In the illustrated embodiment, coupling assembly 222 includes a pair of oppositely disposed pockets 232*a*, 232*b*. In addition, coupling assembly 222 includes a radially inwardly extending conical end 234 having an inner conical surface 234*a*.

An assembly process for rotor blade assembly 200 will now be described. As best seen in FIG. 4B, a metallic support ring 236 is disposed within root section 212 of rotor blade 210 generally radially aligned with tapered section 218. An upper surface of bearing race 202 is positioned relative to a lower surface of rotor blade 210. A conical wear ring 244, such as a segmented conical wear ring, is positioned proximate outer conical surface 208*a* of bearing race 202. Coupling member 222*b* is positioned relative to root section 212 such that radially inwardly tapered inner surface 230 mates with radially outwardly tapered outer surface 220 and such that pockets 216*a*, 216*b* of inboard section 216 are aligned with pockets 232*a*, 232*b* of coupling member 222*b*. At the same time, coupling member 222*b* is positioned relative to bearing race 202 such that radially outwardly extending conical end 208 of bearing race 202 is positioned within radially inwardly extending conical end 234 with conical wear ring 244 positioned between inner conical surface 234*a* and outer conical surface 208*a*. Conical wear ring 244 is a metal wear ring that is softer than the metal of bearing race 202 and coupling assembly 222 such that conical wear ring 244 acts as a sacrificial element. In certain embodiments, inner conical surface 234*a* and/or outer conical surface 208*a* may be surface treated such that they are much harder than conical wear ring 244. Anti-rotation keys 238*a*, 238*b* are placed within the cavities created respectively by pockets 216*a*, 232*a* and pockets 216*b*, 232*b*.

Coupling member 222*a* may now be positioned relative to root section 212 such that radially inwardly tapered inner surface 230 mates with radially outwardly tapered outer surface 220 and such that pockets 216*a*, 216*b* of inboard section 216 are aligned with pockets 232*a*, 232*b* of coupling member 222*a*. At the same time, coupling member 222*a* is positioned relative to bearing race 202 such that radially outwardly extending conical end 208 of bearing race 202 is positioned within radially inwardly extending conical end 234 with conical wear ring 244 positioned between inner conical surface 234a and outer conical surface 208a. In this manner, anti-rotation keys 238a, 238b are captured between rotor blade 210 and coupling assembly 222 and serve as an anti-rotation element to prevent relative rotation therebetween when rotor blade assembly 200 is fully assembled. The two parts of coupling assembly 222 may now be circumferentially secured together about root section 212 of rotor blade 210 and radially outwardly extending conical end 208 of bearing race 202. In the illustrated embodiment, this is achieved using three circumferential bands 240a, 240b, 240c that are received within radially inwardly projecting channels in coupling members 222a, 222b. Circumferential bands 240a, 240b, 240c each include two semi-circumferential members that are coupled together with bolts, as best seen in FIG. 4A. In this manner, coupling members 222a, 222b are secured together and secured to root section 212 of rotor blade 210 and radially outwardly extending conical end 208 of bearing race 202. In this manner, a centrifugal force load path is provided between composite rotor blade 210 and metallic bearing race 202 by metallic coupling assembly 222. In the illustrated embodiment, the friction between inner conical surface 234a, conical wear ring 244 and outer conical surface 208 generated by the centrifugal force supported between metallic bearing race 202 and metallic coupling assembly 222 during rotary operations, provides an anti-rotation element therebetween.

Figure 5B:
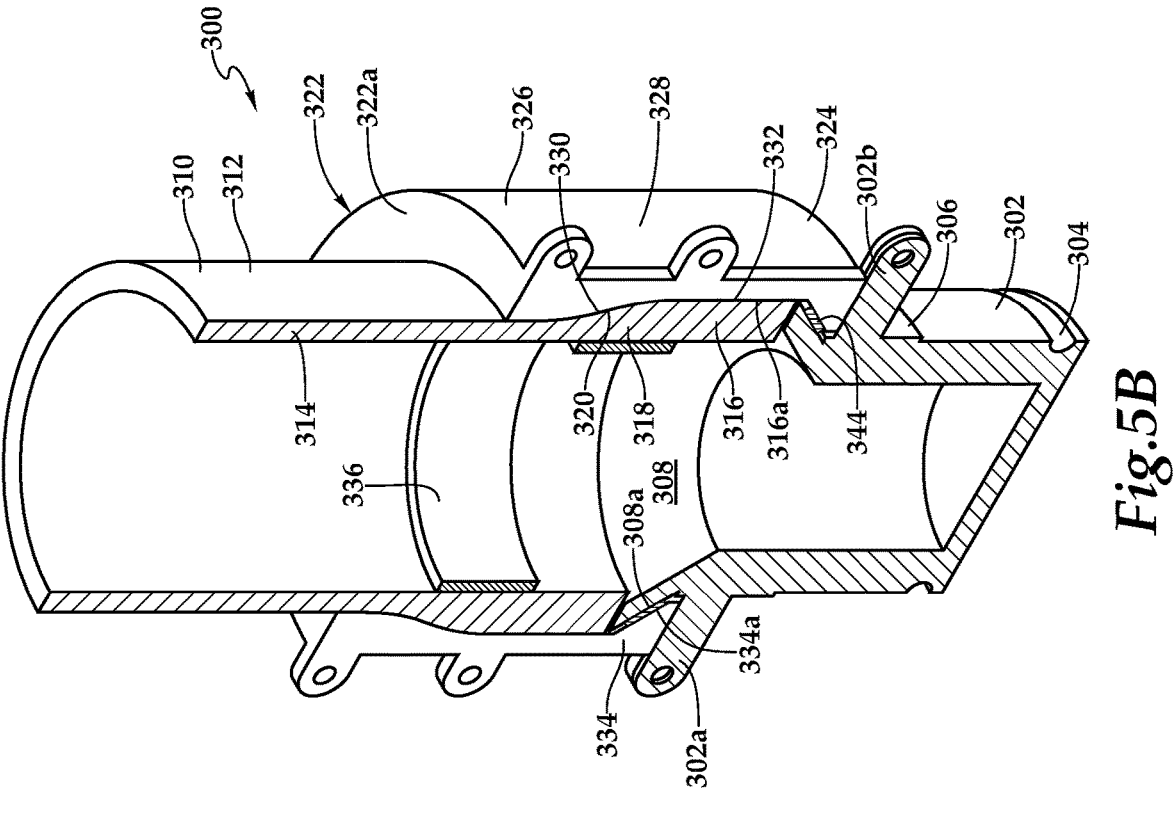
FIGS. 5A-5B are front and cross sectional views of a metallic coupling assembly coupling a composite rotor blade to a metallic bearing race to provide a centrifugal force load path therebetween in accordance with embodiments of the present disclosure.
Figure 5A:
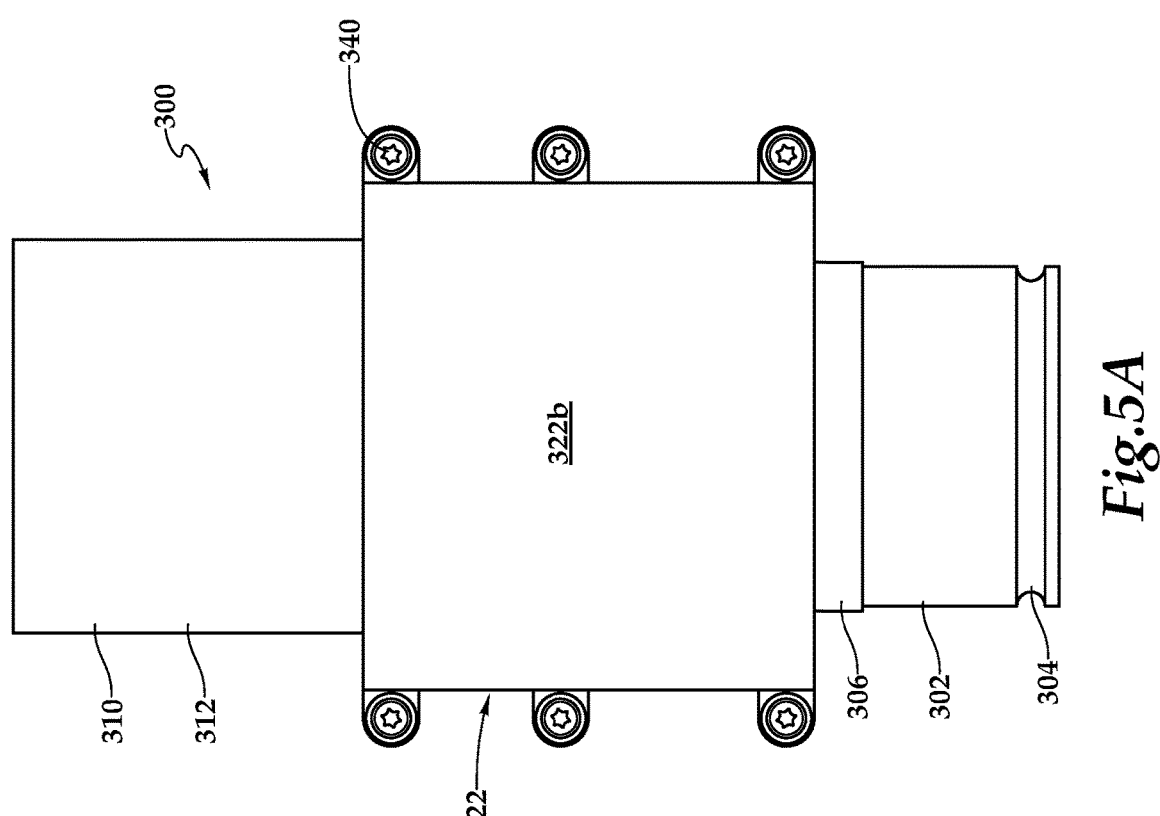

Referring next to FIGS. 5A-5B in the drawings, component parts of a rotor blade assembly 300 that is representative of rotor blade assemblies 64 will now be discussed. Rotor blade assembly 300 includes a metallic bearing race 302, depicted as including a ball bearing race 304 and a roller bearing race 306, that is received within and supported by one of the bearing assemblies 64a of rotor hub 62. Bearing race 302 includes a radially outwardly extending conical end 308 having an outer conical surface 308a. Bearing race 302 also includes radially extending lugs 302a, 302b. Rotor blade assembly 300 includes a composite rotor blade 310 with only the root section 312 being visible in the drawings. Root section 312 of rotor blade 310 has a generally cylindrical shape with a constant inner diameter along its length but a changing outer diameter along its length. More specifically, root section 312 has an outboard section 314 having a first wall thickness and an inboard section 316 having a second wall thickness that is greater than the first wall thickness with a tapered section 318 therebetween having a radially outwardly tapered outer surface 320 extending from outboard section 314 to inboard section 316. Radially outwardly tapered outer surface 320 may progress in a linear or nonlinear manner and may have different contours or slopes in different portions thereof. In the illustrated embodiment, inboard section 316 of root section 312 has a polygonal shaped outer perimeter depicted as an octagonal shaped outer perimeter 316a.

Rotor blade assembly 300 includes a metallic coupling assembly 322 depicted as two semi-cylindrical coupling members 322a, 322b each having a flange end that together form a substantially cylindrical coupling assembly with a generally constant outer diameter along its length but a changing inner diameter along its length. More specifically, an inboard section 324 of coupling assembly 322 has a first wall thickness and an outboard section 326 of coupling assembly 322 has a second wall thickness that is greater than the first wall thickness with a tapered section 328 therebetween having a radially inwardly tapered inner surface 330 extending from inboard section 324 to outboard section 326. Radially inwardly tapered inner surface 330 has a matching profile with radially outwardly tapered outer surface 320 such that radially inwardly tapered inner surface 330 provides a centrifugal force seat for radially outwardly tapered outer surface 320 and thus for rotor blade 310. A compliant layer, such as an adhesive layer or polymer layer, may provide an interface between radially inwardly tapered inner surface 330 and radially outwardly tapered outer surface 320 that may allow for certain strain resolution between rotor blade 310 and coupling assembly 322. In the illustrated embodiment, coupling assembly 322 has a polygonal shaped inner perimeter depicted as an octagonal shaped inner perimeter 332. In addition, coupling assembly 322 includes a radially inwardly extending conical end 334 having an inner conical surface 334a.

An assembly process for rotor blade assembly 300 will now be described. As best seen in FIG. 5B, a metallic support ring 336 is disposed within root section 312 of rotor blade 310 generally radially aligned with tapered section 318. An upper surface of bearing race 302 is positioned relative to a lower surface of rotor blade 310. A conical wear ring 344, such as a segmented conical wear ring, is positioned proximate outer conical surface 308a of bearing race 302. Coupling member 322b is positioned relative to root section 312 such that radially inwardly tapered inner surface 330 mates with radially outwardly tapered outer surface 320 and such that octagonal shaped outer perimeter 316a mates with octagonal shaped inner perimeter 332. At the same time, coupling member 322b is positioned relative to bearing race 302 such that radially outwardly extending conical end 308 of bearing race 302 is positioned within radially inwardly extending conical end 334 with conical wear ring 344 positioned between inner conical surface 334a and outer conical surface 308a. Lugs 302a, 302b are received within notches in the flange end of coupling member 322b.

Coupling member 322a may now be positioned relative to root section 312 such that radially inwardly tapered inner surface 330 mates with radially outwardly tapered outer surface 320 and such that octagonal shaped outer perimeter 316a mates with octagonal shaped inner perimeter 332. At the same time, coupling member 322a is positioned relative to bearing race 302 such that radially outwardly extending conical end 308 of bearing race 302 is positioned within radially inwardly extending conical end 334 with conical wear ring 344 positioned between inner conical surface 334a and outer conical surface 308a. Lugs 302a, 302b are also received within notches in the flange end of coupling member 322a. In this manner, octagonal shaped outer perimeter 316a and octagonal shaped inner perimeter 332 create a polygonal interface and in this case an octagonal interface that serves as an anti-rotation element to prevent relative rotation between coupling assembly 322 and rotor blade 310 when rotor blade assembly 300 is fully assembled. The two parts of coupling assembly 322 may now be circumferentially secured together about root section 312 of rotor blade 310 and radially outwardly extending conical end 308 of bearing race 302. In the illustrated embodiment, this is achieved using a plurality of bolts 340 to couple flange ends of coupling members 322a, 322b together, as best seen in FIG. 5A. In this manner, coupling members 322a, 322b are secured together and secured to root section 312 of rotor blade 310 and radially outwardly extending conical end 308 of bearing race 302. A centrifugal force load path is provided between composite rotor blade 310 and metallic bearing race 302 by metallic coupling assembly 322. In addition, as lugs 302a, 302b of bearing race 302 are clamped and bolted between the flange ends of coupling members 322a, 322b, this provides an anti-rotation element between metallic coupling assembly 322 and bearing race 302.

Compared to prior mechanisms for coupling composite rotor blades to metallic bearing races, the present embodiments provide for the use of a larger diameter root section without requiring a larger diameter hub, thereby increasing the root to chord ratio of the rotor blade as well as the strength and durability of the root section thereof. In addition, the use of the coupling assemblies of the present embodiments, allows for inspection of the rotor blades and in particular inspection of the root sections of the rotor blades as each rotor blade is removable from the rotor hub by disconnection of the coupling assembly. This removability feature also allows for the replacement of wearable components or any individual components of the rotor assembly as requiring according to a maintenance schedule or as discovered during an inspection.

Figure 6:
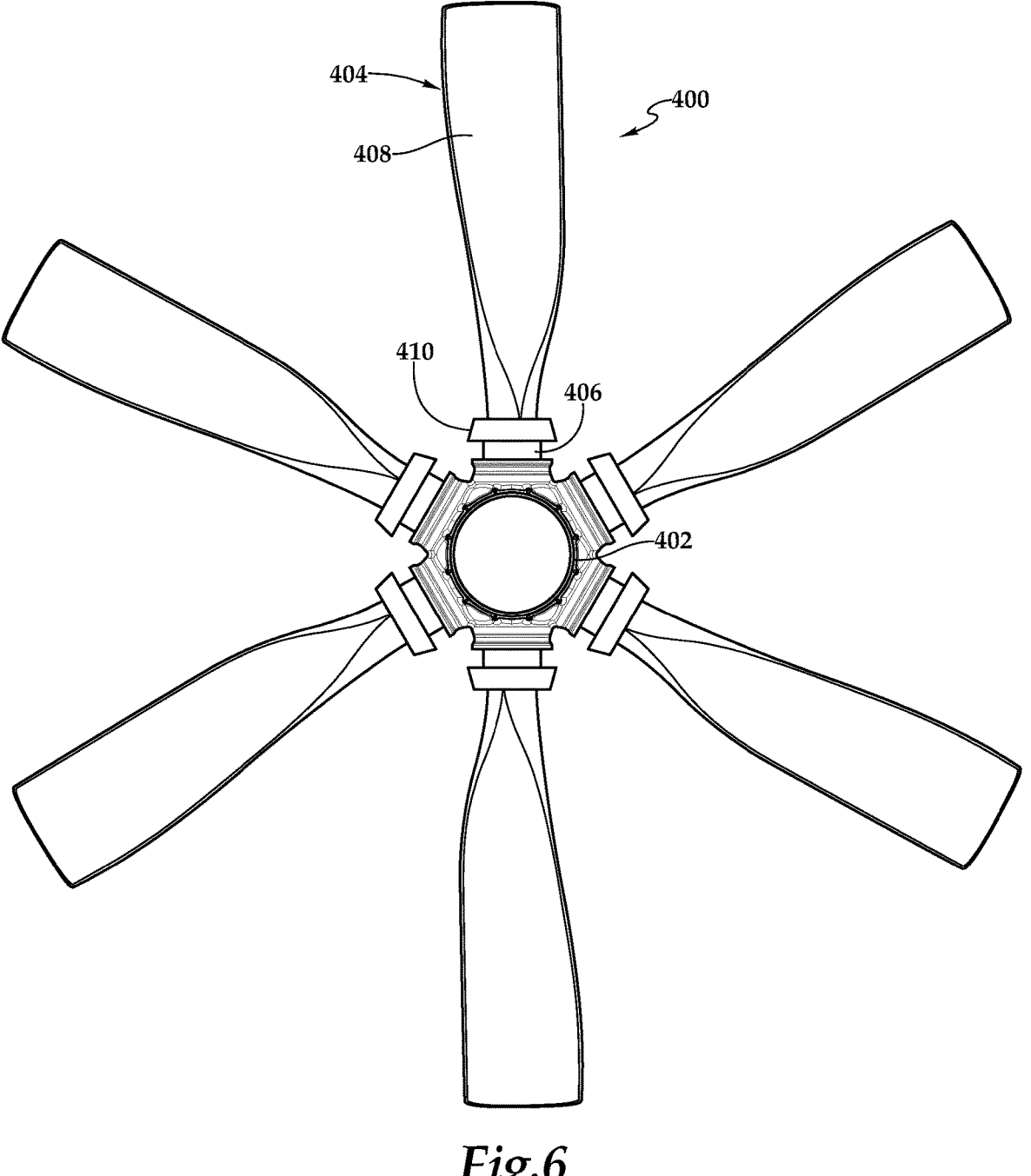
FIG. 6 is a front elevation view of a rotor assembly for generating vehicle thrust in accordance with embodiments of the present disclosure.

Referring next to FIG. 6 in the drawings, a rotor assembly for generating vehicle thrust is depicted and generally designated 400. Rotor assembly 400 includes a rotor hub 402 and a plurality of rotor blade assemblies 404. Rotor hub 402 and/or rotor blade assemblies 404 could be used in rotor assemblies 28, 30 disclosed herein. Rotor hub 402 houses structural and control components that support the centrifugal force generated by rotor blade assemblies 404 and enable collective pitch operations of rotor blade assemblies 404 to provide variable thrust to a vehicle such as vehicle 10 disclosed herein. Specifically, each rotor blade assembly 404 is coupled to rotor hub 402 via a bearing assembly (not visible) disposed within rotor hub 402, such as a bearing assembly that includes a ball bearing set and a roller bearing set, which react centrifugal and bending loads from the rotor blade assembly 404 during rotary operations and collective pitch change operations. In the illustrated embodiment, each rotor blade assembly 404 includes a metallic bearing race 406, a composite rotor blade 408 and a split collet assembly 410 that provides a centrifugal force load path between rotor blade 408 and bearing race 406.

Figure 7A:
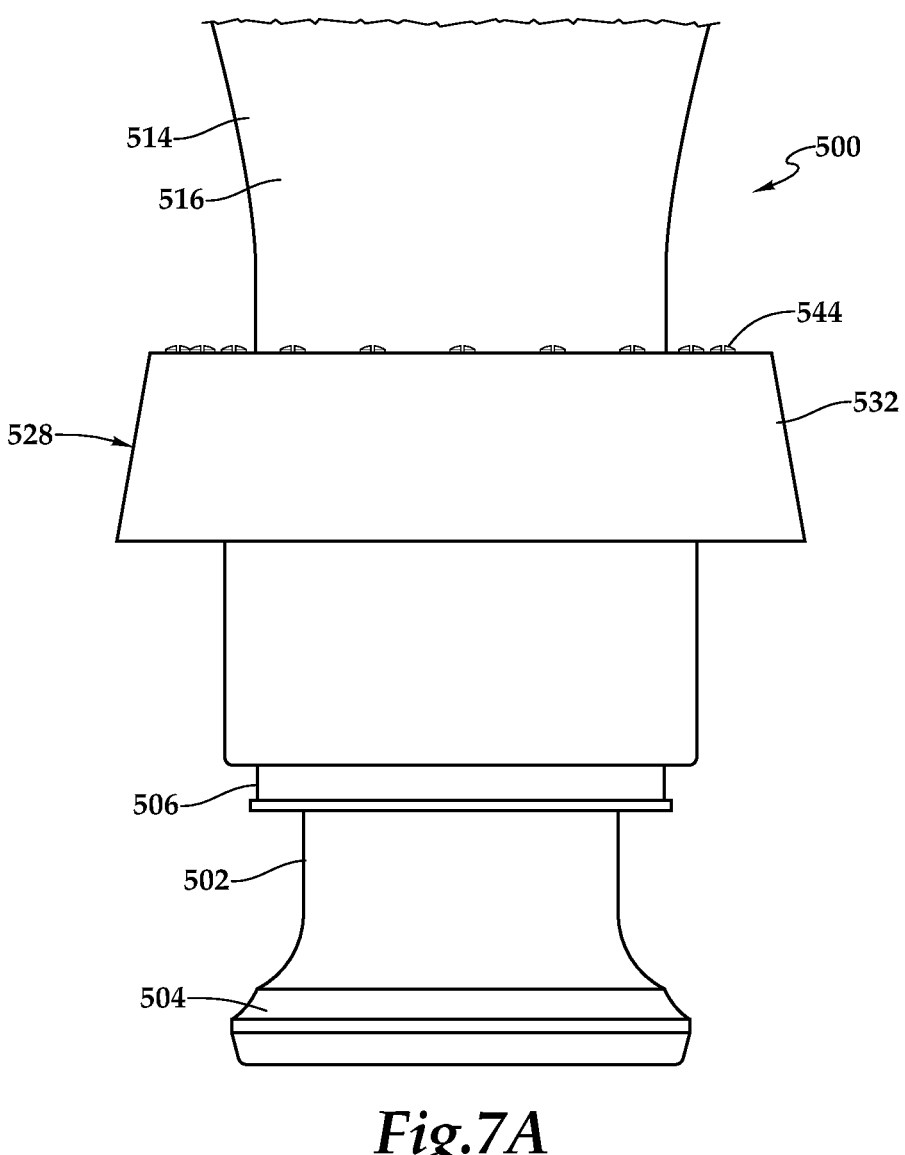
FIGS. 7A-7C are various views of a split collet assembly coupling a composite rotor blade to a metallic bearing race to provide a centrifugal force load path therebetween in accordance with embodiments of the present disclosure.
Figure 7B:
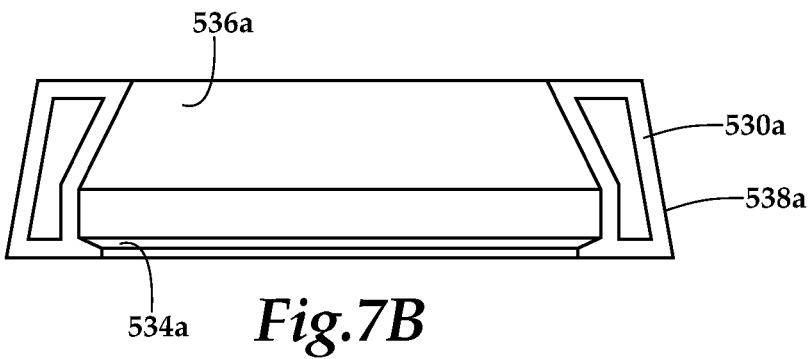
Figure 7C:
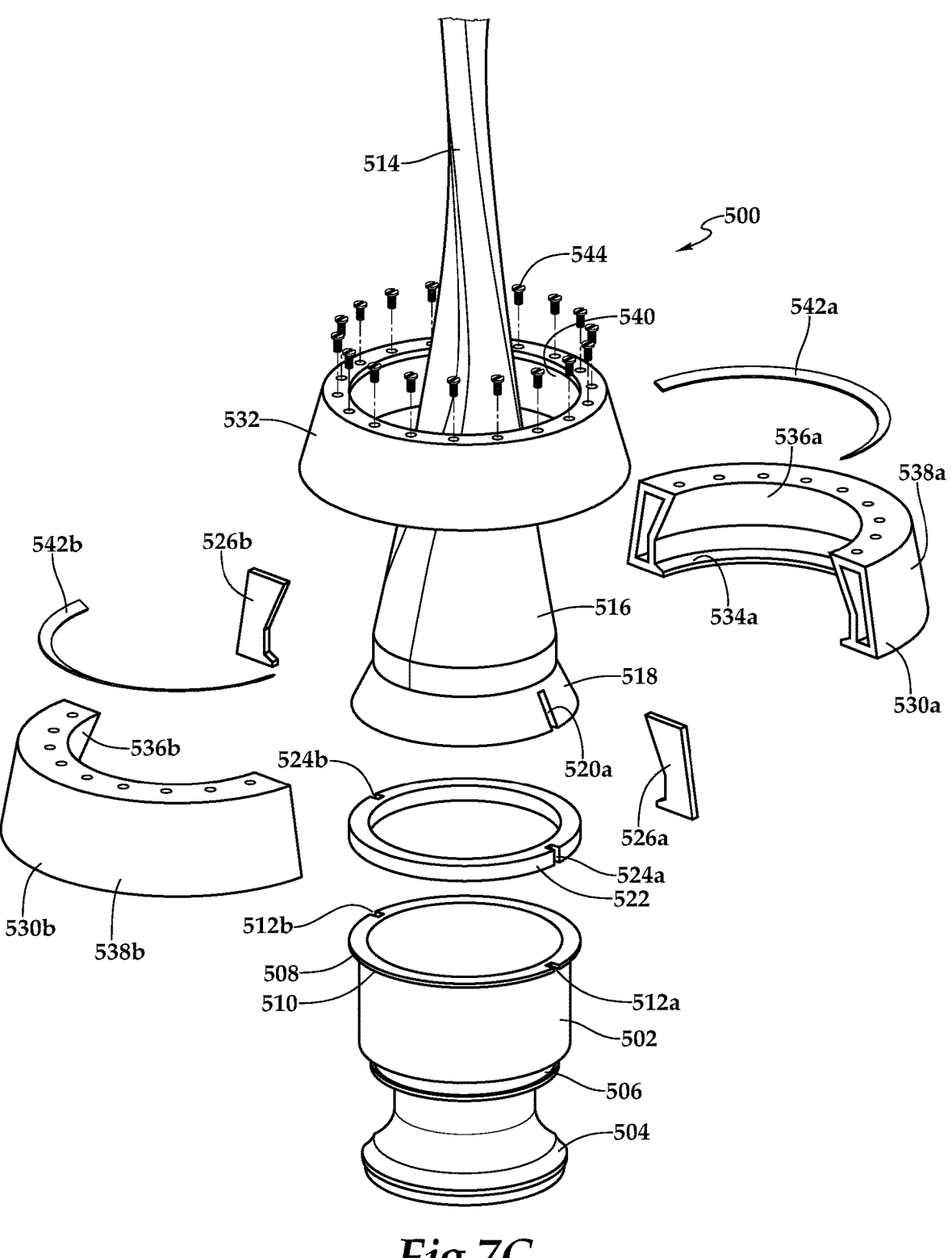

Referring next to FIGS. 7A-7C in the drawings, component parts of a rotor blade assembly 500 that is representative of rotor blade assemblies 404 will now be discussed. Rotor blade assembly 500 includes a metallic bearing race 502, depicted as including a ball bearing race 504 and a roller bearing race 506, that is received within and supported by one of the bearing assemblies of the rotor hub. Bearing race 502 is formed from a material that has suitable hardness, toughness, corrosion resistance and strength, including tensile strength and fatigue strength, such as steel. Bearing race 502 has an outboard end that includes a radially outwardly extending conical feature 508 having an outer conical surface 510. Conical feature 508 of bearing race 502 includes a pair of oppositely disposed slots 512a, 512b. Rotor blade assembly 500 includes a composite rotor blade 514 with a root section 516 including a root end having a radially outwardly extending conical feature 518. Conical feature 518 of rotor blade 514 includes a pair of oppositely disposed slots 520a, 520b, only slot 520a being visible in FIG. 7C. Rotor blade 514 is formed from a high strength, lightweight material such as carbon fiber. Rotor blade assembly 500 may include an optional spacer ring 522 used to adjust the axial distance between bearing race 502 and rotor blade 514. Spacer ring 522 has a pair of oppositely disposed slots 524a, 524b. Spacer ring 522 is formed from a material that has suitable strength such as steel.

Rotor blade assembly 500 includes a pair of oppositely disposed anti-rotation elements depicted as anti-rotation shims 526a, 526b that prevent relative rotation between bearing race 502 and rotor blade 514 when rotor blade assembly 500 is fully assembled. Anti-rotation shims 526a, 526b are formed from a material that has suitable strength such as steel. Rotor blade assembly 500 includes a split collet assembly 528 that includes a pair of oppositely disposed collet members 530a, 530b and an outer sleeve 532. Referring specifically to FIG. 7B in the drawings, collet member 530a is disclosed in further detail. Collet member 530b is substantially similar to collet member 530a therefore, for sake of efficiency, certain features will be disclosed only with regard to collet member 530a. One having ordinary skill in the art, however, will fully appreciate an understanding of collet member 530b based upon the disclosure herein of collet member 530a. FIG. 7B depicts a side view of collet member 530a. In the illustrated embodiment, collet member 530a has an inner inboard conical seat 534a that is configured to mate with conical feature 508 of bearing race 502. In addition, collet member 530a has an inner outboard conical seat 536a that is configured to mate with conical feature 518 of rotor blade 514. Collet member 530a also has an outer conical surface 538a. Outer sleeve 532 has an inner conical surface 540 that mates with outer conical surfaces 538a, 538b of collet members 530a, 530b. Rotor blade assembly 500 includes a conical wear ring depicted as a segmented conical wear ring formed from a pair of oppositely disposed wear ring segments 542a, 542b. Wear ring segments 542a, 542b are formed from a material that has suitable fretting resistance, friction properties and hardness such as a beryllium copper. Even though rotor blade assembly 500 has been depicted and described as having two each of slots in bearing race 502, rotor blade 514 and spacer ring 522 as well as two each of anti-rotation shims, collet members and wear ring segments, it should be understood by those having ordinary skill in the art that a rotor blade assembly of the present disclosure could have other numbers of these components such as three each, four each or more.

An assembly process for rotor blade assembly 500 will now be described. As best seen in FIG. 7C, rotor blade 514 and bearing race 502 are axially positioned together with spacer ring 522 disposed therebetween. The thickness of spacer ring 522 being determined based upon the desired distance between rotor blade 514 and bearing race 502. Slot 520a of rotor blade 514, slot 524a of spacer ring 522 and slot 512a of bearing race 502 are circumferentially aligned. Likewise, slot 520b (not visible) of rotor blade 514, slot 524b of spacer ring 522 and slot 512b of bearing race 502 are circumferentially aligned. Anti-rotation shim 526a is positioned within the combined slot formed collectively by slots 520a, 524a, 512a and anti-rotation shim 526b is positioned within the combined slot formed collectively by slots 520b, 524b, 512b. The thickness of anti-rotation shims 526a, 526b being determined based upon the desired distance between collet member 530a, 530b.

Wear ring segment 542a is placed within collet member 530a adjacent to inner inboard conical seat 534a and wear ring segment 542b is placed within collet member 530b adjacent to inner inboard conical seat 534b (not visible). Collet members 530a, 530b are now moved into contact with rotor blade 514 and bearing race 502. More specifically, collet member 530a is positioned such that inner inboard conical seat 534a mates with conical feature 508 of bearing race 502 with wear ring segment 542a positioned therebetween and such that inner outboard conical seat 536a mates with conical feature 518 of rotor blade 514 with the respective ends of collet member 530a abutting side surfaces of anti-rotation shims 526a, 526b. Likewise, collet member 530*b* is positioned such that inner inboard conical seat 534*b* mates with conical feature 508 of bearing race 502 with wear ring segment 542*b* positioned therebetween and such that inner outboard conical seat 536*b* mates with conical feature 518 of rotor blade 514 with the respective ends of collet member 530*b* abutting side surfaces of anti-rotation shims 526*a*, 526*b*. Now, outer sleeve 532 is moved into contact with collet members 530*a*, 530*b* such that inner conical surface 540 mates with outer conical surfaces 538*a*, 538*b* of collet members 530*a*, 530*b*. As outer conical surfaces 538*a*, 538*b* of collet members 530*a*, 530*b* and inner conical surface 540 of outer sleeve 532 are radially inwardly tapered in the outboard direction, installation of outer sleeve 532 onto collet members 530*a*, 530*b* is achieved by moving outer sleeve 532 in the inboard direction toward collet members 530*a*, 530*b*. A plurality of fasteners depicted as tension bolts 544 may be used to couple outer sleeve 532 collet members 530*a*, 530*b*. In this configuration, outer sleeve 532 and collet members 530*a*, 530*b* form split collet assembly 528, as best seen in FIG. 7A. Also, in this configuration, outer sleeve 532 maintains collet members 530*a*, 530*b* in a circumferential orientation around bearing race 502 and rotor blade 514 such that split collet assembly 528 provides a centrifugal force load path between rotor blade 514 and bearing race 502.

Figure 8A:
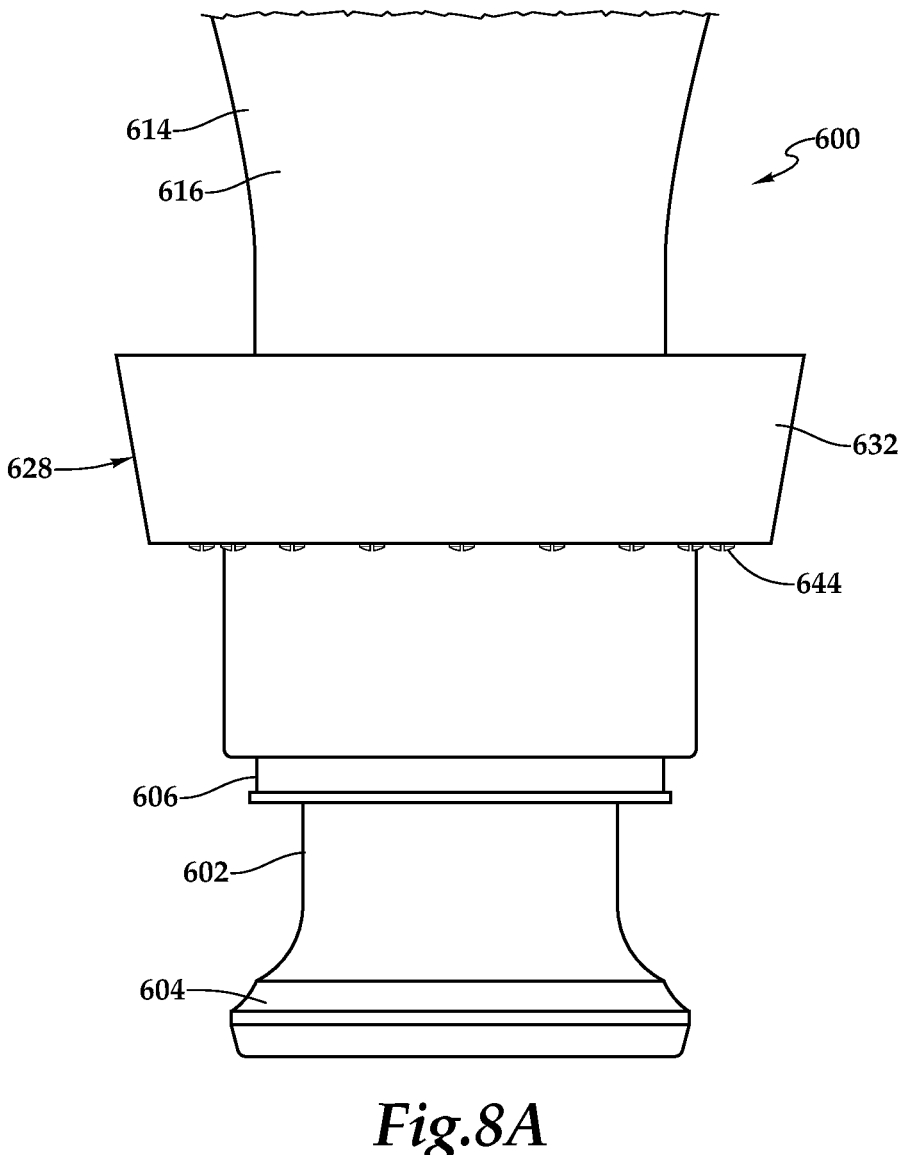
FIGS. 8A-8C are various views of a split collet assembly coupling a composite rotor blade to a metallic bearing race to provide a centrifugal force load path therebetween in accordance with embodiments of the present disclosure.
Figure 8B:
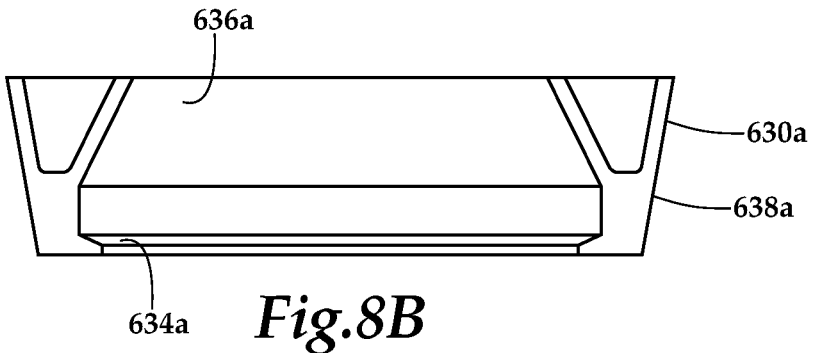
Figure 8C:
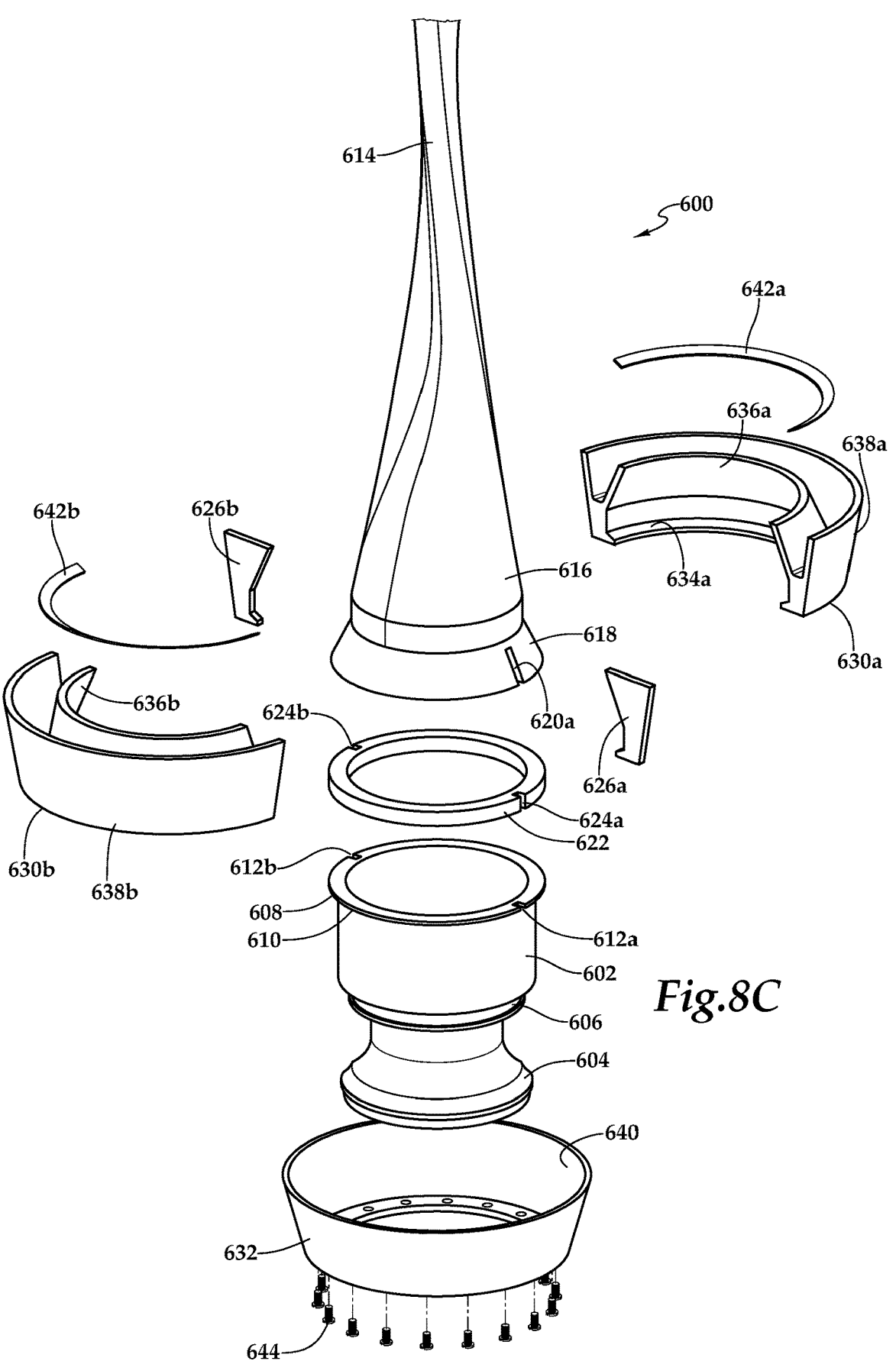

Referring next to FIGS. 8A-8C in the drawings, component parts of a rotor blade assembly 600 that is representative of rotor blade assemblies 404 will now be discussed. Rotor blade assembly 600 includes a metallic bearing race 602, depicted as including a ball bearing race 604 and a roller bearing race 606, that is received within and supported by one of the bearing assemblies of the rotor hub. Bearing race 602 is formed from a material that has suitable hardness, toughness, corrosion resistance and strength, including tensile strength and fatigue strength, such as steel. Bearing race 602 has an outboard end that includes a radially outwardly extending conical feature 608 having an outer conical surface 610. Conical feature 608 of bearing race 602 includes a pair of oppositely disposed slots 612*a*, 612*b*. Rotor blade assembly 600 includes a composite rotor blade 614 with a root section 616 including a root end having a radially outwardly extending conical feature 618. Conical feature 618 of rotor blade 614 includes a pair of oppositely disposed slots 620*a*, 620*b*, only slot 620*a* being visible in FIG. 8C. Rotor blade 614 is formed from a high strength, lightweight material such as carbon fiber. Rotor blade assembly 600 may include an optional spacer ring 622 used to adjust the axial distance between bearing race 602 and rotor blade 614. Spacer ring 622 has a pair of oppositely disposed slots 624*a*, 624*b*. Spacer ring 622 is formed from a material that has suitable strength such as steel.

Rotor blade assembly 600 includes a pair of oppositely disposed anti-rotation elements depicted as anti-rotation shims 626*a*, 626*b* that prevent relative rotation between bearing race 602 and rotor blade 614 when rotor blade assembly 600 is fully assembled. Anti-rotation shims 626*a*, 626*b* are formed from a material that has suitable strength such as steel. Rotor blade assembly 600 includes a split collet assembly 628 that includes a pair of oppositely disposed collet members 630*a*, 630*b* and an outer sleeve 632. Referring specifically to FIG. 8B in the drawings, collet member 630*a* is disclosed in further detail. Collet member 630*b* is substantially similar to collet member 630*a* therefore, for sake of efficiency, certain features will be disclosed only with regard to collet member 630*a*. One having ordinary skill in the art, however, will fully appreciate an understanding of collet member 630*b* based upon the disclosure herein of collet member 630*a*. FIG. 8B depicts a side view of collet member 630*a*. In the illustrated embodiment, collet member 630*a* has an inner inboard conical seat 634*a* that is configured to mate with conical feature 608 of bearing race 602. In addition, collet member 630*a* has an inner outboard conical seat 636*a* that is configured to mate with conical feature 618 of rotor blade 614. Collet member 630*a* also has an outer conical surface 638*a*. Outer sleeve 632 has an inner conical surface 640 that mates with outer conical surfaces 638*a*, 638*b* of collet members 630*a*, 630*b*. Rotor blade assembly 600 includes a conical wear ring depicted as a segmented conical wear ring formed from a pair of oppositely disposed wear ring segments 642*a*, 642*b*. Wear ring segments 642*a*, 642*b* are formed from a material that has suitable fretting resistance, friction properties and hardness such as a beryllium copper. Even though rotor blade assembly 600 has been depicted and described as having two each of slots in bearing race 602, rotor blade 614 and spacer ring 622 as well as two each of anti-rotation shims, collet members and wear ring segments, it should be understood by those having ordinary skill in the art that a rotor blade assembly of the present disclosure could have other numbers of these components such as three each, four each or more.

An assembly process for rotor blade assembly 600 will now be described. As best seen in FIG. 8C, rotor blade 614 and bearing race 602 are axially positioned together with spacer ring 622 disposed therebetween. The thickness of spacer ring 622 being determined based upon the desired distance between rotor blade 614 and bearing race 602. Slot 620*a* of rotor blade 614, slot 624*a* of spacer ring 622 and slot 612*a* of bearing race 602 are circumferentially aligned. Likewise, slot 620*b* (not visible) of rotor blade 614, slot 624*b* of spacer ring 622 and slot 612*b* of bearing race 602 are circumferentially aligned. Anti-rotation shim 626*a* is positioned within the combined slot formed collectively by slots 620*a*, 624*a*, 612*a* and anti-rotation shim 626*b* is positioned within the combined slot formed collectively by slots 620*b*, 624*b*, 612*b*. The thickness of anti-rotation shims 626*a*, 626*b* being determined based upon the desired distance between collet member 630*a*, 630*b*.

Wear ring segment 642*a* is placed within collet member 630*a* adjacent to inner inboard conical seat 634*a* and wear ring segment 642*b* is placed within collet member 630*b* adjacent to inner inboard conical seat 634*b* (not visible). Collet members 630*a*, 630*b* are now moved into contact with rotor blade 614 and bearing race 602. More specifically, collet member 630*a* is positioned such that inner inboard conical seat 634*a* mates with conical feature 608 of bearing race 602 with wear ring segment 642*a* positioned therebetween and such that inner outboard conical seat 636*a* mates with conical feature 618 of rotor blade 614 with the respective ends of collet member 630*a* abutting side surfaces of anti-rotation shims 626*a*, 626*b*. Likewise, collet member 630*b* is positioned such that inner inboard conical seat 634*b* mates with conical feature 608 of bearing race 602 with wear ring segment 642*b* positioned therebetween and such that inner outboard conical seat 636*b* mates with conical feature 618 of rotor blade 614 with the respective ends of collet member 630*b* abutting side surfaces of anti-rotation shims 626*a*, 626*b*. Now, outer sleeve 632 is moved into contact with collet members 630*a*, 630*b* such that inner conical surface 640 mates with outer conical surfaces 638*a*, 638*b* of collet members 630*a*, 630*b*. As outer conical surfaces 638*a*, 638*b* of collet members 630*a*, 630*b* and inner conical surface 640 of outer sleeve 632 are radially outwardly tapered in the outboard direction, installation of outer sleeve 632 onto collet members 630*a*, 630*b* is achieved by moving outer sleeve 632 in the outboard direction toward collet members 630*a*, 630*b*. A plurality of fasteners depicted as tension bolts 644 may be used to couple outer sleeve 632 collet members 630*a*, 630*b*. In this configuration, outer sleeve 632 and collet members 630*a*, 630*b* form split collet assembly 628, as best seen in FIG. 8A. Also, in this configuration, outer sleeve 632 maintains collet members 630*a*, 630*b* in a circumferential orientation around bearing race 602 and rotor blade 614 such that split collet assembly 628 provides a centrifugal force load path between rotor blade 614 and bearing race 602.

The present embodiments provide numerous benefits over prior rotor assembly designs for amphibious air-cushion vehicle and other thrust driven vehicles. In the present embodiments, the diameter of the root end the composite rotor blade can be enlarged which provides more strength to the root end of the rotor blade. In addition, the composite rotor blade is located outboard of the metallic bearing race which not only allows for inspection of the composite rotor blade but also provides access to the rotor blade for maintenance and/or replacement without removal of component parts of the rotor hub or the entire rotor hub. In addition, the use of a conical wear ring as a sacrificial element enhances the longevity of larger more expensive components such as the bearing race and the collet members.

The foregoing description of embodiments of the disclosure has been presented for purposes of illustration and description. It is not intended to be exhaustive or to limit the disclosure to the precise form disclosed, and modifications and variations are possible in light of the above teachings or may be acquired from practice of the disclosure. The embodiments were chosen and described in order to explain the principals of the disclosure and its practical application to enable one skilled in the art to utilize the disclosure in various embodiments and with various modifications as are suited to the particular use contemplated. For example, numerous combinations of the features disclosed herein will be apparent to persons skilled in the art including the combining of features described in different and diverse embodiments, implementations, contexts, applications and/ or figures. Other substitutions, modifications, changes and omissions may be made in the design, operating conditions and arrangement of the embodiments without departing from the scope of the present disclosure. Such modifications and combinations of the illustrative embodiments as well as other embodiments will be apparent to persons skilled in the art upon reference to the description. It is, therefore, intended that the appended claims encompass any such modifications or embodiments.

What is claimed is:

1. A rotor assembly for generating vehicle thrust, the rotor assembly comprising:

a rotor hub; and a plurality of rotor blade assemblies coupled to the rotor hub, each rotor blade assembly including:

a metallic bearing race having an outboard end with a radially outwardly extending conical feature;

a composite rotor blade having a root end with a radially outwardly extending conical feature;

a split collet assembly including at least two circumferentially distributed collet members and an outer sleeve; and at least one shim operably coupling the bearing race and the rotor blade to prevent relative rotation therebetween;

wherein, each of the collet members has an inner inboard conical seat configured to mate with the conical feature of the bearing race, an inner outboard conical seat configured to mate with the conical feature of the rotor blade and an outer conical surface; and wherein, the outer sleeve has an inner conical surface that mates with the outer conical surfaces of the collet members such that the outer sleeve maintains the collet members in a circumferential orientation around the bearing race and the rotor blade such that the split collet assembly provides a centrifugal force load path between the rotor blade and the bearing race.

2. The rotor assembly as recited in claim 1 further comprising a duct and a plurality of stators coupling the duct to the rotor hub such that the rotor blade assemblies are disposed within the duct.

3. The rotor assembly as recited in claim 1 wherein, each of the bearing races further comprises a ball bearing race and a roller bearing race.

4. The rotor assembly as recited in claim 1 wherein, each of the bearing races is a steel bearing race.

5. The rotor assembly as recited in claim 1 wherein, each of the rotor blades is a carbon fiber rotor blade.

6. The rotor assembly as recited in claim 1 wherein, each of the collet members is a titanium collet member or a steel collet member.

7. The rotor assembly as recited in claim 1 wherein, each of the outer sleeves is a steel outer sleeve.

8. The rotor assembly as recited in claim 1 wherein, each rotor blade assembly further comprises a conical wear ring disposed between the inner inboard conical seats of the collet members and the conical feature of the bearing race.

9. The rotor assembly as recited in claim 8 wherein, each of the conical wear rings is a segmented conical wear ring.

10. The rotor assembly as recited in claim 8 wherein, each of the conical wear rings is a beryllium copper conical wear ring.

11. The rotor assembly as recited in claim 1 wherein, for each rotor blade assembly, the bearing race includes at least one slot and the rotor blade includes at least one slot; and wherein, the at least one shim is positioned at least partially within circumferentially aligned slots of the bearing race and the rotor blade such that the at least one shim prevents relative rotation between the bearing race and the rotor blade.

12. The rotor assembly as recited in claim 1 wherein, for each rotor blade assembly, the bearing race includes first and second slots and the rotor blade includes first and second slots; and wherein, the at least one shim further comprises first and second shims, the first shim positioned at least partially within circumferentially aligned first slots of the bearing race and the rotor blade, the second shim positioned at least partially within circumferentially aligned second slots of the bearing race and the rotor blade such that the first and second shims prevent relative rotation between the bearing race and the rotor blade.

13. The rotor assembly as recited in claim 12 wherein, each shim is circumferentially positioned between two of the collet members.

14. The rotor assembly as recited in claim 1 wherein, each rotor blade assembly further comprises a spacer ring positioned between the bearing race and the rotor blade.

15. The rotor assembly as recited in claim 14 wherein, each of the spacer rings is a steel spacer ring.

16. The rotor assembly as recited in claim 1 wherein, for each rotor blade assembly, the outer conical surfaces of the collet members and the inner conical surface of the outer sleeve are radially inwardly tapered in an outboard direction.

17. The rotor assembly as recited in claim 1 wherein, each rotor blade assembly further comprises a plurality of fasteners coupling the outer sleeve to the collet members.

18. A vehicle operable for forward motion responsive to thrust, the vehicle comprising:

a rotor assembly including a rotor hub and a plurality of rotor blade assemblies coupled to the rotor hub, each rotor blade assembly including:

a metallic bearing race having an outboard end with a radially outwardly extending conical feature;

a composite rotor blade having a root end with a radially outwardly extending conical feature;

a split collet assembly including at least two circumferentially distributed collet members and an outer sleeve; and at least one shim operably coupling the bearing race and the rotor blade to prevent relative rotation therebetween;

wherein, each of the collet members has an inner inboard conical seat configured to mate with the conical feature of the bearing race, an inner outboard conical seat configured to mate with the conical feature of the rotor blade and an outer conical surface; and wherein, the outer sleeve has an inner conical surface that mates with the outer conical surfaces of the collet members such that the outer sleeve maintains the collet members in a circumferential orientation around the bearing race and the rotor blade such that the split collet assembly provides a centrifugal force load path between the rotor blade and the bearing race.

19. The vehicle as recited in claim 18 wherein the vehicle is an amphibious air-cushion vehicle.

* * * * *